United States Patent [19]
Boykin

[11] Patent Number: 4,761,030
[45] Date of Patent: Aug. 2, 1988

[54] CONVERTIBLE WINDBREAK

[76] Inventor: Kanda Boykin, 86 Barbaree Way, Tiburon, Calif. 94920

[21] Appl. No.: 927,330

[22] Filed: Nov. 4, 1986

[51] Int. Cl.$^4$ ............................................. B62D 25/00
[52] U.S. Cl. ................................... 296/1 S; 296/107; 296/136
[58] Field of Search ................. 296/1 S, 1 R, 136, 85, 296/107; 297/219, 220

[56] References Cited

U.S. PATENT DOCUMENTS

| | | | |
|---|---|---|---|
| 3,154,341 | 10/1964 | Booth | 296/136 |
| 3,172,695 | 3/1965 | Bordinat, Jr. | 296/136 |

Primary Examiner—Robert R. Song
Attorney, Agent, or Firm—Larry D. Johnson

[57] ABSTRACT

The invention provides a removable partition or envelope device that can be placed over the seatbacks and headrests of a convertible automobile to create a barrier to air that would otherwise flow between, around or over the seatbacks, thereby extending a wind-blocking surface beyond the normal cross-section of the seatbacks and headrests themselves. The windbreak can be constructed of leather, fabric, vinyl or other appropriate material, and may include stiffeners or ribs to enhance the barrier's structural integrity and keep its shape against the wind. The windbreak may be manufactured in predetermined sizes to fit particular automobile seat applications, or it may be made of expandable material to fit a variety of seat/headrest combinations. Alternatively, the windbreak may incorporate a means for adjustment, such as a variable overlap portion, to enable the user to specifically fit the device to the seatbacks in his vehicle. In addition, an elastic belt or other attachment means may be included in the base of the device to more tightly secure the device to the seats.

6 Claims, 1 Drawing Sheet

U.S. Patent     Aug. 2, 1988     4,761,030
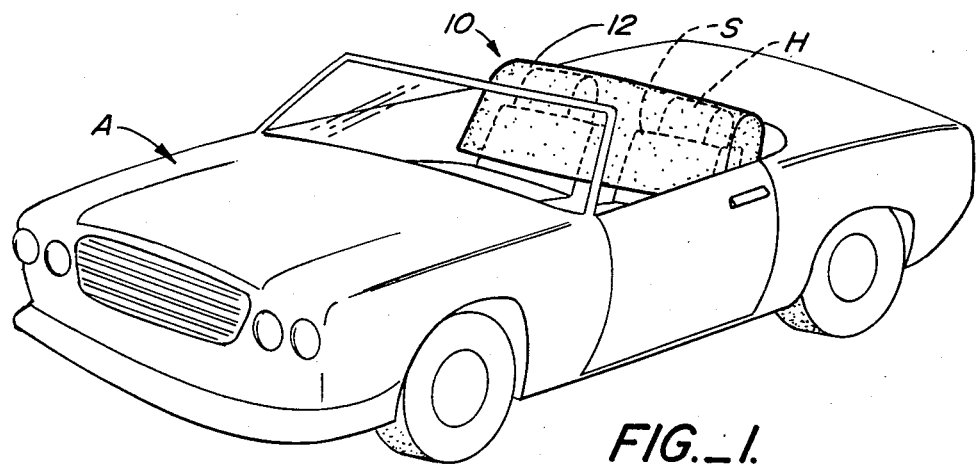
FIG._1.
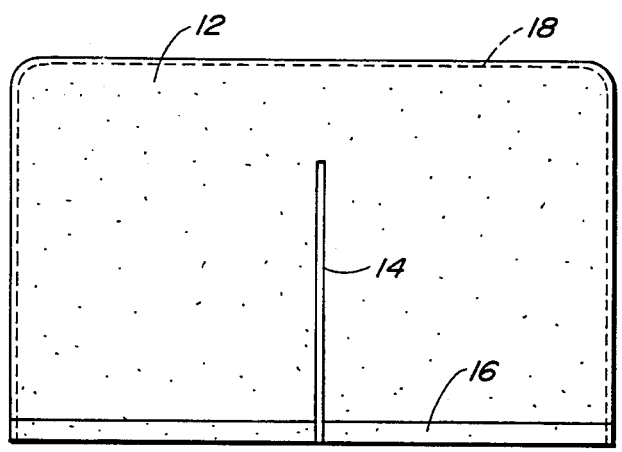
FIG._2.
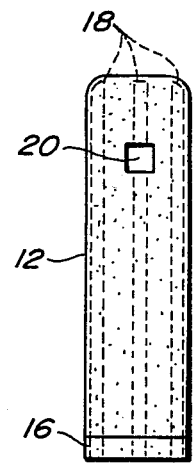
FIG._3.
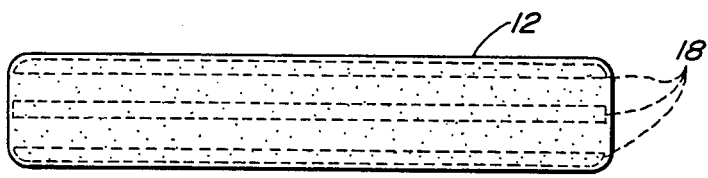
FIG._4.

CONVERTIBLE WINDBREAK

BACKGROUND OF THE INVENTION

1. Field of the Invention

This invention relates generally to automobile accessories, and more specifically to a windbreaking device for convertible automobiles.

2. Description of the Prior Art

While there are numerous shapes, styles, and sizes of automobiles, few command the attention, attracton and appeal of convertibles and other removable-top vehicles. Many drivers desire the sensation of openness and freedom offered by driving a convertible. Other drivers prefer convertibles for their features of essentially unlimited ventilation and cooling. Still others select convertibles for their functionality in carrying oversized objects that would simply not fit into a standard hard-top automobile.

However, the openness and unlimited ventilation derived from driving a convertible automobile can have its drawbacks as well. For example, when a convertible is driven at highway speeds, or on a particularly windy day, the passenger compartment of the vehicle can become so windblown and turbulent as to be uncomfortable or even dangerous. Even driving at relatively slow speeds can set up air circulation within the vehicle that is greater than that which is desired. The usual solution to this problem is for the driver to partially or completely roll up the windows of the vehicle, creating an often unpleasant "fish tank" effect. Alternatively, and more effectively, the driver can stop the vehicle and raise the convertible top completely into position. This, however, negates all the benefits of driving the convertible in the first place, and is time-consuming and cumbersome.

SUMMARY OF THE INVENTION

The convertible windbreak of this invention provides a removable partition or envelope device that can be placed over the seatbacks and headrests of a convertible automobile to create a barrier to air that would otherwise flow between, around or over the seatbacks, thereby extending a wind-blocking surface beyond the normal cross-section of the seatbacks and headrests themselves. The windbreak can be constructed of leather, fabric, vinyl or other appropriate material, and may include stiffeners or ribs to enhance the barrier's structural integrity and keep its shape against the wind. The windbreak may be manufactured in predetermined sizes to fit particular automobile seat applications, or it may be made of expandable material to fit a variety of seat/headrest combinations. Alternatively, the windbreak may incorporate a means for adjustment, such as a variable overlap portion, to enable the user to specifically fit the device to the seatbacks in his vehicle. In addition, an elastic belt or other attachment means may be included in the base of the device to more tightly secure the device to the seats. Thus, the convertible windbreak device can be an inexpensive and efficient original equipment or aftermarket item to improve driveability and comfort for convertible automobiles.

The convertible windbreak device performs particularly well with convertibles containing bucket seats, since such seats usually have the greatest open area between them, which would allow otherwise uninhibited airflow. However, the device is also usable with bench-type seats, and seats without headrests, as long as the windbreak device provides some additional wind-blocking surface beyond the dimensions of the seats themselves.

BRIEF DESCRIPTION OF THE DRAWINGS

FIG. 1 is a perspective view of the convertible windbreak of this invention in place covering the seatbacks and headrests of a typical convertible automobile;

FIG. 2 is an elevated back view of a convertible windbreak;

FIG. 3 is an elevated side view of a convertible windbreak; and

FIG. 4 is a top plan view of a convertible windbreak.

DETAILED DESCRIPTION OF A PREFERRED EMBODIMENT

FIG. 1 is a perspective view showing the convertible windbreak of this invention in place on a convertible automobile. Convertible windbreak 10 comprises a removably attached envelope or shell 12 that is non-permeable to wind or air circulation, that covers automobile seatbacks S and headrests H to form a barrier to prevent air from circulating within the open cockpit of a convertible automobile A, when the automobile is driven at speed. Shell 12 acts as a simple windbreak to prevent moving air that would otherwise flow between, around, and/or over the seatbacks and into the passenger area, and thus significantly reduces wind and turbulence to the occupants. Shell 12 may extend partially or entirely down the height of the seatbacks, depending on the degree of wind obstruction necessary or desired. Similarly, the shell may extend above the seatbacks and headrests for any distance, although it has been determined that positioning of the top of the device merely to the top of the headrests frequently provides sufficient wind obstruction.

FIG. 2 shows an elevated back view of windbreak 10. Shell 12 is preferably made of leather or vinyl material, complementary to the material actually used in auto seats and seatcovers. Some such materials are sufficiently expandable to enable a given shell to fit over a variety of differently sized seatbacks and seatback-/headrest combinations. For further adjustability, the back side of shell 12 may be split, and the seam closed with hook-and-loop fastener or other closure 14 along overlap segments of various widths. Elastic belt portion 16 may be included at the base of shell 12, to more tightly secure the device in position on the seatbacks.

Depending on the stiffness of the material used to construct shell 12, and the particular application, it may be necessary to reinforce the desired shape of the device, especially where the shell extends beyond the actual seatback and headrest dimensions. Stiffeners or ribs 18, shown in phantom, may take the form of plastic, rope, or other sufficiently rigid material, and may be incorporated to the inside surface of shell 12, and thus be invisible from the outside. The stiffeners may extend around the entire perimeter of shell 12, or may merely be segmented or placed in the corners of the shell only, where additional rigidity may be required.

FIGS. 3 and 4 show side and top views, respectively, of the convertible windbreak device. These views further illustrate the stiffeners 18 (again in phantom), extending along the perimeter of shell 12. Cut-out portion 20 may be included in the side of the shell to accomodate the seatback adjustment or release levers found on many automobile seats.

While this invention has been described in connection with preferred embodiments thereof, it is obvious that modifications and changes therein may be made by those skilled in the art to which it pertains without departing from the spirit and scope of the invention. For example, the convertible windbreak of this invention could be constructed of a single sheet member or partition attachable to just one side (front or rear) of the automobile's seats, and still provide the requisite windbreaking function. Accordingly, the scope of this invention is to be limited only by the appended claims.

What is claimed as invention is:

1. A windbreaking device for a convertible automobile having seatbacks extending generally vertically relative to said automobile, said seatbacks defining a first cross-sectional area in the plane of their vertical extension, said windbreaking device comprising:
a partition member comprising an envelope member conditioned for placement over said seatbacks and to cover said seatbacks with a windblocking material, so that said partition member defines a second cross-sectional area in the plane of said seatback's vertical extension which is greater than said first cross-sectional area.

2. The windbreaking device of claim 1 wherein said windblocking material comprises a flexible, impermeable material.

3. The windbreaking device of claim 2 wherein said envelope includes rib members to increase the structural rigidity of said envelope.

4. The windbreaking device of claim 3 wherein said envelope has an outer perimeter, and said rib members are positioned along said perimeter.

5. The windbreaking device of claim 1 wherein said envelope includes adjustment means to accommodate different seatback sizes.

6. The windbreaking device of claim 1 wherein said envelope includes means for securing said envelope to said seatbacks.

* * * * *